April 6, 1965 C. R. SWANSON 3,177,451

BROAD BAND TIME DELAY NETWORK HAVING FLEXIBLE GROUND PLANE BETWEEN COIL FORM AND DELAY HELIX WOUND THEREON

Filed March 30, 1959 2 Sheets-Sheet 1

INVENTOR
Carl R. Swanson

BY James E. Tracy
ATTORNEY

April 6, 1965 C. R. SWANSON 3,177,451

BROAD BAND TIME DELAY NETWORK HAVING FLEXIBLE GROUND PLANE BETWEEN COIL FORM AND DELAY HELIX WOUND THEREON

Filed March 30, 1959 2 Sheets-Sheet 2

INVENTOR
Carl R. Swanson

BY James E. Tracy
ATTORNEY

United States Patent Office 3,177,451
Patented Apr. 6, 1965

3,177,451

BROAD BAND TIME DELAY NETWORK HAVING FLEXIBLE GROUND PLANE BETWEEN COIL FORM AND DELAY HELIX WOUND THEREON

Carl R. Swanson, Des Plaines, Ill., assignor to Zenith Radio Corporation, a corporation of Delaware Filed Mar. 30, 1959, Ser. No. 802,956
5 Claims. (Cl. 333—31)

This invention is directed to a novel time-delay network of the distributed-parameter type for translating, without appreciable attenuation or phase distortion, signal components included within a relatively wide frequency range.

As is well known, one typical distributed-parameter delay network comprises a winding wound around a supporting, elongated coil form, a conductive ground plane being positioned between the winding and the form. The capacitance between the winding and the ground plane provides the distributed capacitance of the network which, together with the inductance of the winding, determines the total time delay and impedance exhibited by the network. A delay of any particular interval may be obtained by appropriately selecting the physical and electrical characteristics of the components.

Several methods of making such a basic distributed-parameter delay line are known. For example, a silver coating may be fired to a glass or ceramic rod to provide the necessary ground plane and coil form. As another example, a conductive paint may be sprayed on a coil form constructed of an insulating material. As still another example, a relatively thin sheet of metallic foil, such as copper, may be cemented to a coil form.

While such methods do lend themselves to the making of an adequate distributed-parameter time-delay network of basic design, when it is necessary to incorporate some of the known refinements of features into a time-delay network, such methods leave a great deal to be desired. A delay line of the basic construction is definitely restricted in performance, frequencywise, due to the attenuation and phase distortion to which a signal is subjected as it is translated along the line. For example, such a basic delay network is totally unacceptable when it is desired to delay video signals which extend up to 4.5 megacycles.

In order to extend the linear response of the delay network into the frequency spectrum, in accordance with a well known technique, a series of elongated conductive, phase equalizing patches or electrodes are positioned parallel to the longitudinal axis of the coil form between the winding and the form. The metallic patches in a sense "float" electrically and provide bridging capacitances between adjacent winding turns.

For the basic, described delay-line the ground plane may be continuous but when that is the case eddy currents are produced therein to the extent that the pass band characteristic is substantially limited. Moreover, such eddy currents represent a power loss. In order to reduce them, another known refinement or improvement resides in slotting or splitting up the ground plane so that it in effect comprises a series of parallel conductive lines, electrically joined at one end, with the lines being parallel to the axis of the coil form and thus perpendicular to the plane of each winding turn.

It will surely be appreciated that if both the feature of providing bridging or linking condensers and that of providing a slotted ground plane are to be included in a time delay network, the prior methods of manufacturing or assembling can only be employed with substantial difficulty, if at all. For example, if the coil form is sprayed with a conductive paint, the areas which are not to be covered have to be masked during the spraying process. Alternatively, a continuous coating may be applied and then portions thereof may be cut, etched or scratched off to provide the desired pattern of parallel lines and patches. Such operations are, of course, relatively expensive.

Accordingly, it is an object of the present invention to provide a new and improved time-delay network of the distributed parameter type which is considerably simpler and less expensive than those employed heretofore.

It is another object of the invention to provide such an improved device that lends itself to mass production.

In accordance with the invention, there is provided a time-delay network of the distributed parameter type in which a ground plane, made up of a series of electrically joined parallel conductive lines, is positioned between an elongated coil form having a longitudinal axis and a continuous helically wound insulated wire. The ground plane has a pattern of conductive areas, defining the series of electrically joined parallel lines, on a flexible sheet of insulating material. The flexible sheet is wrapped about the coil form in such a manner that the parallel lines are also parallel to the axis. Finally, the novel device has the insulated wire wound about both the flexible sheet and the coil form with the plane of each winding turn being substantially perpendicular to the conductive lines.

The features of this invention which are believed to be new are set forth with particularity in the appended claims. This invention, together with further objects and advantages thereof, may best be understood, however, by reference to the following description in conjunction with the accompanying drawings, in which identical reference numerals indicate identical elements, and in which:

Figure 1:
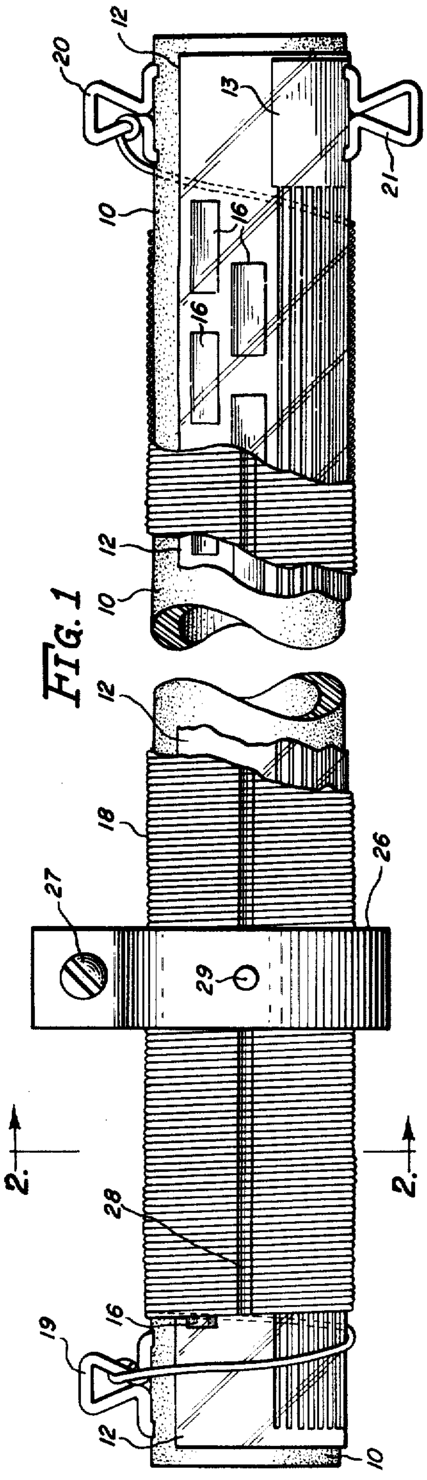
FIGURE 1 is a schematic representation, partially cut-away, of a distributed-parameter time-delay network which has been manufactured in accordance with one embodiment of the invention.
Figure 3:
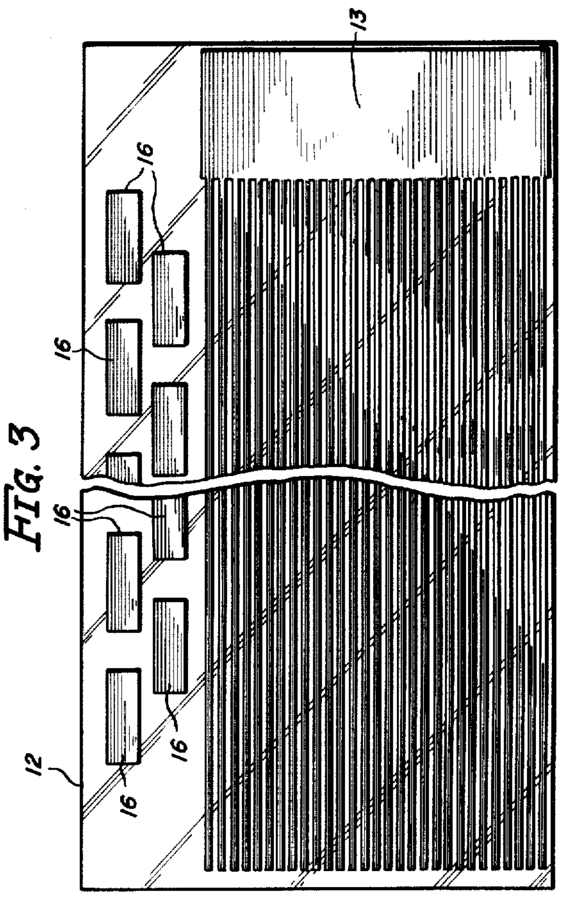
FIGURE 3 illustrates a component of the time-delay network of FIGURE 1 before it is incorporated therein.
Figure 2:
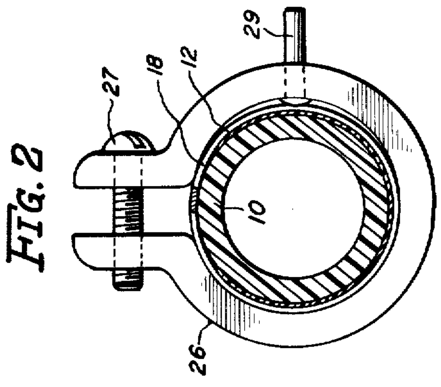
FIGURE 2 is a sectional view of the delay network of FIGURE 1 taken along the lines 2—2.
Figure 5:
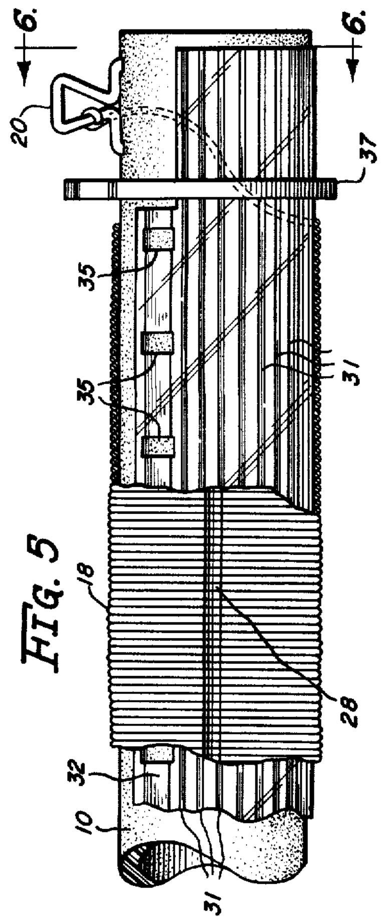
Figure 8:
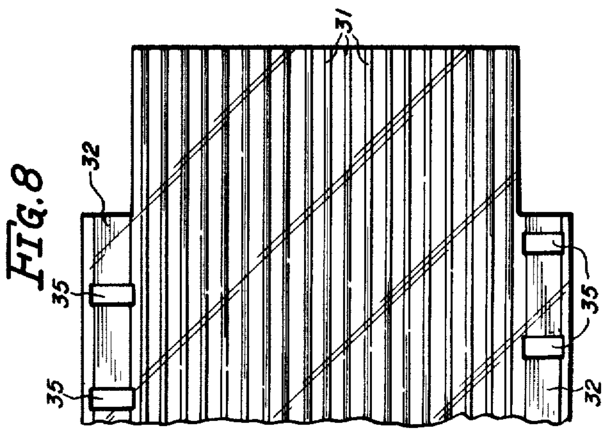
Figure 7:
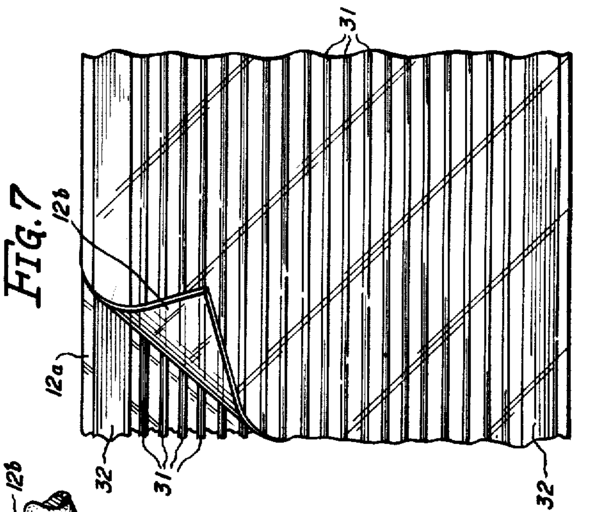
Figure 9:
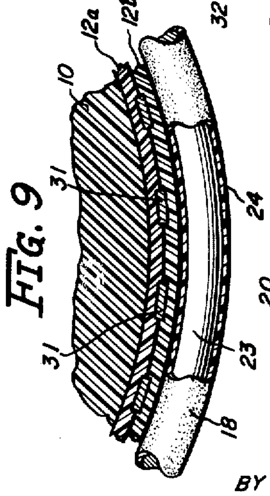
Figure 6:
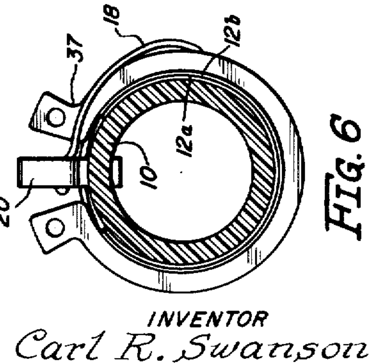

FIGURE 5 discloses another time-delay network, also partially cut-away, which has been made in accordance with another embodiment of the invention;

FIGURE 6 is a sectional view of the network of FIGURE 5 taken along the lines 6—6;

FIGURE 7 shows a component of the network of FIGURE 5 illustrating its form at an intermediate step in the manufacturing process;

FIGURE 8 shows the same component as is illustrated in FIGURE 7 except subsequent to a later manufacturing step;

FIGURE 9 discloses a portion of the delay line of FIGURE 5 drawn on a greatly expanded time scale and taken in the direction of the arrows associated with lines 6—6.

Referring now more particularly to FIGURES 1–4, the entwork shown comprises an elongated, hollow coil form 10, which may be cylindrically shaped and preferably constructed of some insulating material such as Bakelite. Of course, the coil form may take any desired configuration; for example, its cross section may be elliptical, square or rectangular. Wrapped around coil form 10 is a rectangular, flexible sheet of insulating material 12, taking the form for example of a sheet of transparent acetate, on which has been affixed or printed a pattern of conductive areas. As perhaps best seen in FIGURE 3, which shows flexible sheet 12 flattened out and before it is wrapped around coil form 10, the conductive areas include a ground plane 13 consisting of a series of parallel conductive lines or strips electrically joined at one end, namely on the right. As mentioned previously, a slotted ground plane is desirable in order to reduce eddy current effects. The length dimension of sheet 12 is approximately equal to the length of coil form 10, while the width dimension is less than the circumference of the form. Sheet 12 is wrapped around form 10 in such a manner that the parallel conductive lines or strips of ground plane 13 are also parallel to the longitudinal axis of the coil form.

Additionally, a series of elongated conductive phase equalizing patches 16 are also affixed or printed onto flexible sheet 12. As shown, there are two rows of such patches with the patches of each row being staggered with respect to those of the other and with both rows extending generally parallel to the conductive lines.

Figure 4:
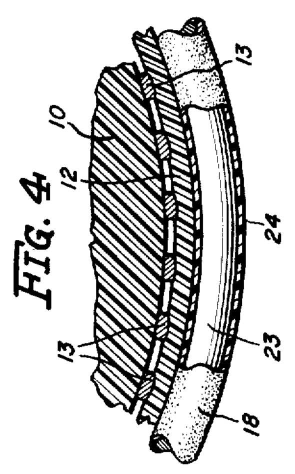
FIGURE 4 is a cross-sectional view of a small portion of the delay line of FIGURE 1 drawn on a greatly expanded scale and taken in the direction of the arrows associated with lines 2—2.

Flexible sheet 12 is wrapped around the coil form with the side or surface to which conductive areas 13 and 16 are affixed being closest to coil form 10, as is seen in FIGURE 4.

Ground plane 13 and conductive patches 16 may be affixed to acetate sheet 12 by means of any well known printing technique, such as the silk screening process, or for that matter by any of the customary stencilling, etching, or the like, operations.

An insulated wire is wound around both flexible sheet 12 and coil form 10, with the plane of each turn being perpendicular to the parallel lines of ground plane 13, to form inductance winding 18. Terminals 19 and 20 are mechanically affixed to coil form 10 and electrically connected, such as by means of solder, to the opposite ends of winding 18 to provide input and output terminals for the delay line. Another terminal 21 is positioned on flexible sheet 12 in the conductive area of ground plane 13 where all of the parallel conductive lines are electrically joined together and is mechanically secured to coil form 10 through flexible sheet 12. At the same time, because of the intimate electrical contact thereby established between ground plane 13 and terminal 21, a common input-output terminal is provided.

With this arrangement, a distributed capacitance exists between the winding turns of winding 18 and the parallel lines of ground plane 13, with the insulation of the wire and flexible sheet 21 serving as the dielectric. In FIGURE 4 a portion of a single winding turn of winding 18 is cut-away to illustrate the metallic electrical conductor portion, labeled 23, and the external insulating portion, which may for example merely constitute an enamel coating, designated 24.

The distributed capacitance between winding 18 and ground plane 13 is determined by the physical dimensions of the parallel conductive lines making up the ground plane, the dielectric constant and thickness of the insulation surrounding the wire of winding 18, and the dielectric constant and thickness of flexible sheet 12. The self and mutual inductance of the winding is determined by the diameter of coil form 10, the size and type of conductor used in fabricating the winding, and the total number of turns. The distributed capacitance, in conjunction with the inductance, determines the total time delay and impedance of the network which is so selected that a signal applied to input terminals 19, 21 is delayed for the desired duration before it appears at output terminals 20, 21.

The selection of the parameters is also governed by the frequency response characteristic desired, that is, the desired frequency range over which applied signals must not be attenuated appreciably nor subjected to phase distortion. To this end, conductive patches 16 are so positioned that each spans several individual winding turns to provide the required bridging capacitances. As previously mentioned, the incorporation of phase equalizing patches 16 extends the linear response into the frequency spectrum.

If it is desired to provide a manual adjustment of the delay line so that the time delay presented to an applied signal may be varied, a split ring 26 (best seen in FIGURE 2), constructed of some insulating material such as nylon, encircles the entire delay line. The split or gap in ring 26 is completed by means of a screw 27 which may be employed to control the pressure exerted by the ring on winding 18. A groove 28, extending substantially parallel to the longitudinal axis of coil form 10, is cut or scratched in winding 18 in order to remove a portion of the insulation from each winding turn. A metallic contact 29 extends through ring 26 and rides in groove 28 to provide an electrical contact to one of the winding turns encircled by ring 26. The input connection to the delay network may be made, for example by means of a soldering operation, to contact 29, instead of to contact 19, and the physical movement of ring 26 along the delay line will connect a different winding turn to contact 29, resulting in a variation of the time delay exhibited by the network.

In constructing the described network of FIGURES 1–4, in accordance with one aspect of the invention, the several component parts thereof are individually fabricated. Ground plane 13 is affixed on flexible sheet 12 and the sheet is then wrapped about coil form 10 such that the parallel lines of the ground plane are parallel to the axis of the coil form. Winding 18 is then helically wound about both the flexible sheet and the coil form with the plane of each winding turn being substantially perpendicular to the conductive lines.

As is well known, in order to minimize the production of eddy currents in the ground plane, the parallel lines must be made as narrow or sharp as possible. By employing the technique of the present invention, the parallel lines may indeed be made sufficiently narrow.

While the invention is not limited to any specific circuit parameters or physical dimensions, the following electrical and physical dimensions of the embodiment of FIGURES 1–4 are given as illustrative of a proven network having a linear phase shift characteristic and having only a 4 decibel attenuation over the pass-band from 0 to 4.5 megacycles.

| | |
|---|---|
| Time delay | 2.2 microseconds. |
| Characteristic impedance | 1500 ohms. |
| Temperature vs. delay characteristic | +150 p.p.m./°c. |
| Rise time | 0.2 microsecond. |
| Material of coil form **10** | Paper base phenolic. |
| Dimensions of form **10** | 0.500 inch O.D. 0.437 inch I.D. and 12 inches in length. |
| Material of flexible sheet **12** | Polyvinyl acetate. |
| Printing technique employed for conductive areas **13** and **16** | Silk screen using high-conductivity silver paint. |
| Number parallel lines in ground plane **13** | 29. |
| Dimensions of parallel lines | .005 x 11.00 inches. |
| Dimensions of phase equalizing patches **16** | 0.187 x 0.635 inch. |
| Number of patches | 24. |
| Conductor characteristics for winding **18** | #37 single polyurethane insulated wire with nominal diameter of 0.0048 inch. |
| Winding specifications | 2200 turns at 198 turns per inch. |

In accordance with another embodiment of the invention instead of employing printing, etching, or the like, techniques for affixing the pattern of conductive areas to the flexible sheet, the conductive areas may take the form of metallic elements that are sandwiched between two flexible sheets. Such an embodiment is shown in FIGURES 5–9. Two flexible sheets of insulating material, 12_a_ and 12_b_ (best shown in FIGURE 7), are positioned on opposite sides of a series of parallel conductive lines or relativley narrow strips 31 (the counterparts of the strips in ground plane 13) and also a pair of relatively wide metallic strips 32. Flexible sheets 12_a_ and 12_b_ may take the form of Mylar or Teflon and the metallic strips may be copper. Sheets 12_a_ and 12_b_ and the metallic strips may be assembled to provide a laminate by the expedient of known rolling techniques. In this way, the laminate may be made on a continuous basis and rolled into a coil, like a spool of tape, if desirable. A section or portion of the laminate having a length approximately equal to the length of coil form 10 may then be taken or cut from the coil. As seen in FIGURE 9, after flexible sheets 12_a_ and 12_b_ and the metallic strips have been rolled and bonded together to provide a single laminate, the metallic strips are essentially imbedded within the sandwich. It will be noted by comparing FIGURES 9 and 4, the dielectric between strips 31 and the metallic portion 23 of the insulated wire includes not only the insulation 24 of the wire, but also flexible sheet 12_b_.

In order to provide the necessary bridging capacitances between adjacent winding turns, metallic strips 32 are subjected to a punching operation so that entire sections 35 are cut away or removed from the lamination. The punching operation is controlled so that cutouts 35 of one metallic strip 32 are staggered with respect to the cutouts of the other strip 32. Thus, the portions of strips 32 remaining essentially take the same form, and serve the same function, as conductive strips 16 in the embodiment of FIGURES 1–4. For obvious economical reasons, punching may be achieved in the same machine that does the laminating.

It can thus be appreciated that in the interest of mass production, the laminate in the embodiment of FIGURES 5–9 may be fabricated considerably easier than flexible sheet 12 and conductive areas 13 and 16 may be made.

In order to electrically join parallel metallic strips 31, portions of the corners of the lamination, including portions of strips 32, are cut away as best shown on the right in FIGURE 8. A metallic split ring 37, constructed preferably of copper, is then placed over the delay line adjacent the cut-away corners of the lamination as shown in FIGURE 5. A voltage is then applied across the two extremities of ring 37 in order to heat it to a temperature sufficient to melt Mylar sheet 12_b_ at that point and to fuse ring 37 to each of strips 31. Ring 37 may then serve as the common input-output connection of the delay line.

As is well known, for best performance it is imperative that the conductivity of the ground plane be as high as possible. Consequently, a material like copper having considerably less resistance than, for example, silver paint is to be preferred. The embodiment of FIGURES 5–9 is thus also attractive from that standpoint since it permits the use of high-conductivity metallic strips or bars.

The delay network of FIGURES 5–9 has been constructed and satisfactorily operated, providing a linear phase shift characteristic and having only a 2 decibel attenuation over a pass-band from 0 to 4.5 megacycles. The electrical and physical characteristics of the constructed delay line were as follows:

| | |
|---|---|
| Time delay | 2.2 microseconds. |
| Characteristic impedance | 1500 ohms. |
| Temperature vs. delay characteristic | +50 p.p.m./°c. |
| Rise time | 0.12 microsecond. |
| Material of coil form **10** | Paper base phenolic. |
| Dimensions of form **10** | 0.500 O.D., 0.437 I.D. and 12 inches in length. |
| Material of flexible sheets **12**_a_ and **12**_b_ | Mylar. |
| Type and thickness of material in conductive strips **31** and **32** | Copper 0.0005 inch thick. |
| Width of ground plane strips **31** | 0.015 inch. |
| Dimensions of metallic patches between cutouts **35** | 0.625 x 0.125 inch. |
| Number of patches | 24. |
| Conductor characteristics | #37 single polyurethane insulated wire with nominal diameter of 0.0048 inch. |
| Winding specifications | 2200 turns at 198 turns per inch. |

The invention provides, therefore, an improved time-delay network of the distributed-parameter type which results in economies of manufacture not realized by any of the prior devices employed heretofore.

While particular embodiments of the invention have been shown and described, modifications may be made, and it is intended in the appended claims to cover all such modifications as may fall within the true spirit and scope of the invention.

I claim:

1. A distributed-parameter, time-delay network comprising:

an elongated rigid coil form having a longitudinal axis;

a flexible sheet of flaccid insulating material wrapped circumferentially about the outer surface of and supported entirely by said coil form;

a ground plane composed of a series of electrically joined, laterally spaced parallel conductive strips affixed to said flexible sheet with an orientation relative to said form such that said conductive strips are also parallel to said longitudinal axis and are spaced circumferentially about said coil form, said ground plane covering less than the entire outer surface area of said coil form;

and a coil helically wound circumferentially about said flexible sheet, said conductive strips and said coil form with the plane of each winding turn being substantially perpendicular to said conductive strips;

whereby the distributed capacitance, determined by the dielectric constant and spacing between and the sizes of said ground plane and said coil, together with the self and mutual inductance of said coil establish a characteristic phase delay time of and impedance to electrical signals translated between the ends of said coil with the spaced distribution of said conductive strips minimizing eddy currents and thereby minimizing power loss and enhancing the frequency width of the passband for such translation.

2. A distributed-parameter, time-delay network comprising:

an elongated rigid coil form having a longitudinal axis;

a flexible sheet of flaccid insulating material wrapped circumferentially about the outer surface of and supported entirely by said coil form;

a ground plane composed of a series of electrically joined, laterally spaced parallel conductive strips affixed to said flexible sheet with an orientation relative to said form such that said conductive strips are also parallel to said longitudinal axis and are spaced circumferentially about said coil form, said ground plane covering less than the entire outer surface area of said coil form;

a plurality of elongated conductive elements also affixed to said flexible sheet and extending generally parallel to said conductive strips;

and a coil helically wound circumferentially about said flexible sheet, said conductive strips, said conductive elements and said coil form with the plane of each winding turn being substantially perpendicular to said conductive strips and with each of said conductive elements spanning a plurality of winding turns;

whereby the distributed capacitance, determined by the dielectric constant and spacing between and the sizes of said ground plane and said coil, together with the self and mutual inductance of said coil establish a characteristic phase delay time of and impedance to electrical signals translated between the ends of said coil with the spaced distribution of said conductive strips minimizing eddy currents and thereby minimizing power loss and enhancing the frequency width of the passband for such translation and with said conductive elements establishing bridging capacitances between adjacent turns of said coil to extend the frequency range of substantially linear translation of said signals as to amplitude and phase delay.

3. A distributed-parameter, time-delay network comprising:

an elongated coil form having a longitudinal axis;

a flexible sheet of insulating material wrapped circumferentially about said coil form;

a ground plane composed of a series of electrically joined, laterally spaced parallel conductive strips affixed to said flexible sheet with an orientation relative to said form such that said conductive strips are also parallel to said longitudinal axis and are spaced circumferentially about said coil form;

two rows of rectangular conductive patches also affixed to said flexible sheet and extending generally parallel to said conductive strips with the patches of each row being staggered with respect to those of the other row;

and a coil helically wound circumferentially about said flexible sheet, said conductive strips, said conductive patches, and said coil form with the plane of each winding turn being substantially perpendicular to said conductive strips and with each of said patches spanning a plurality of winding turns;

whereby the distributed capacitance, determined by the dielectric constant and spacing between and the sizes of said ground plane and said coil, together with the self and mutual inductance of said coil establish a characteristic phase delay time of and impedance to electrical signals translated between the ends of said coil with the spaced distribution of said conductive strips minimizing eddy currents and thereby minimizing power loss and enhancing the frequency width of the passband for such translation and with said conductive elements establishing bridging capacitances between adjacent turns of said coil to extend the frequency range of substantially linear translation of said signals as to amplitude and phase delay.

4. A distributed-parameter, time-delay network comprising:

an elongated rigid coil form having a longitudinal axis;

a laminate wrapped circumferentially about the outer surface of and supported entirely by said coil form and including two flexible sheets of flaccid insulating material between which is positioned a ground plane composed of a series of electrically joined, laterally spaced parallel metallic strips affixed between said flexible sheets with an orientation relative to said form such that said conductive strips are also parallel to said longitudinal axis and spaced circumferentially about said coil form, said ground plane covering less than the entire outer surface area of said coil form;

and a coil helically wound about both said laminate and said coil form with the plane of each winding turn being substantially perpendicular to said metallic strips;

whereby the distributed capacitances, determined by the dielectric constant and spacing between and the sizes of said ground plane and said coil together with the self and mutual inductance of said coil establish a characteristic delay time of and impedance to electrical signals translated between the ends of said coil with the spaced distribution of said metallic strips minimizing eddy currents and thereby minimizing power loss and enhancing the frequency width of the passband for such translation.

5. A distributed-parameter, time-delay network comprising:

an elongated coil form having a longitudinal axis;

a laminate wrapped circumferentially about said coil form and including two flexible sheets of insulating material between which is affixed a ground plane composed of a series of electrically joined, laterally spaced, relatively narrow and parallel metallic strips having an orientation relative to said form such that said metallic strips are also parallel to said longitudinal axis and are spaced circumferentially about said coil form, and also between which flexible sheets are a plurality of elongated conductive elements extending generally parallel to said metallic strips;

and a coil helically wound circumferentially about both said laminate and said coil form with the plane of each winding turn being substantially perpendicular to said metallic strips and with each of said patches spanning a plurality of winding turns;

whereby the distributed capacitance, determined by the dielectric constant and spacing between and the sizes of said ground plane and said coil, together with the self and mutual inductance of said coil establish a characteristic phase delay time of and impedance to electrical signals translated between the ends of said coil with the spaced distribution of said metallic strips minimizing eddy currents and thereby minimizing power loss and enhancing the frequency width of the passband for such translation and with said conductive elements establishing bridging capacitances between the adjacent turns of said coil to extend the frequency range of substantially linear translation of said signals as to amplitude and phase delay.

References Cited in the file of this patent

UNITED STATES PATENTS

| | | |
|---|---|---|
| 845,609 | Brown | Feb. 26, 1907 |
| 1,647,474 | Seymour | Nov. 1, 1927 |
| 2,461,061 | Kallmann | Feb. 8, 1949 |
| 2,522,731 | Wheeler | Sept. 19, 1950 |
| 2,720,578 | Caffiaux et al. | Oct. 11, 1955 |
| 2,915,718 | Grieg et al. | Dec. 1, 1959 |
| 2,943,277 | Lewis | June 28, 1960 |
| 3,015,152 | Marey | Jan. 2, 1962 |

FOREIGN PATENTS

| | | |
|---|---|---|
| 793,793 | Great Britain | Apr. 23, 1958 |

OTHER REFERENCES

Swiggett: Introduction to Printed Circuits, John F. Rider Publisher, Inc., New York, copyright 1956.